Jan. 16, 1951 G. L. USSELMAN 2,538,543

CARRIER SUPPRESSION SIDE BAND GENERATOR

Filed Jan. 8, 1947 3 Sheets-Sheet 1

INVENTOR
GEORGE L. USSELMAN.
BY H. S. Grover
ATTORNEY

Jan. 16, 1951 G. L. USSELMAN 2,538,543

CARRIER SUPPRESSION SIDE BAND GENERATOR

Filed Jan. 8, 1947 3 Sheets-Sheet 2

INVENTOR
GEORGE L. USSELMAN.
BY H. S. Grover
ATTORNEY

INVENTOR
GEORGE L. USSELMAN.
BY H. S. Grover
ATTORNEY

Patented Jan. 16, 1951 2,538,543

UNITED STATES PATENT OFFICE 2,538,543

CARRIER SUPPRESSION SIDE-BAND GENERATOR

George L. Usselman, Port Jefferson, N. Y., assignor to Radio Corporation of America, a corporation of Delaware Application January 8, 1947, Serial No. 720,886

19 Claims. (Cl. 332—45)

This invention relates to a new and useful side band modulation system. The invention is particularly adapted for suppressing or eliminating the carrier frequency and producing the desired side bands, either or both of which may be transmitted or utilized.

Heretofore it has been proposed to use a balanced type modulator stage of several vacuum tubes into which was fed the carrier energy from an oscillator and the signal energy from the signal source. The carrier frequency and the signal frequency were suppressed in the modulator output and the upper and lower side frequencies were allowed to go through. This system required at least three vacuum tubes and occupied a considerable amount of space for both the carrier oscillator and the balanced modulator stages.

In accordance with the present invention, the functions of the carrier frequency generator and the carrier suppression balanced modulator are combined into one circuit resulting in advantages such as saving in space and a reduction in the number of circuit parts, such as vacuum tubes, coils, condensers, etc. In accordance with the invention, one vacuum tube and not more than two are employed, whereas the prior art systems used at least three vacuum tubes.

This invention can best be understood by referring to the accompanying drawings, in which.

Figure 1:
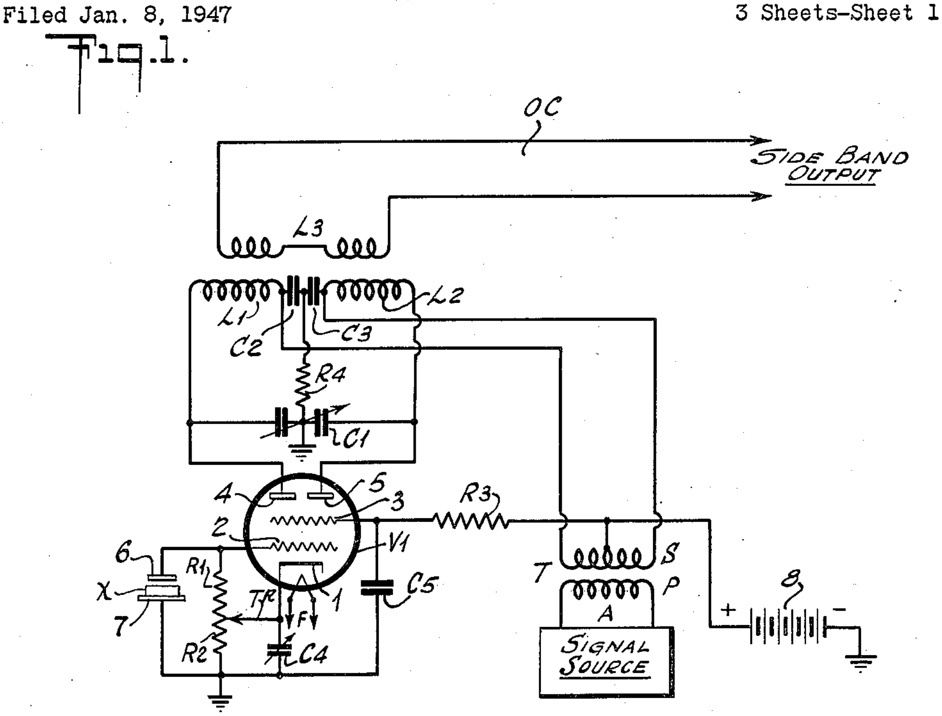
Fig. 1 is a circuit diagram of my invention which employs a multi-element tube having a cathode, a control grid, a screen grid and two anodes.

Referring now to Fig. 1 of the drawing, the vacuum tube V1 is of the type having a single cathode 1, a control grid 2, a screen grid 3, and two separate anodes 4 and 5. The control grid 2 is connected to an electrode 6 of a piezo-electric crystal X and also to ground through resistors R1 and R2. The other electrode 7 of the crystal X is connected to ground. The cathode 1 of the tube V1 is connected to the control grid resistors R1 and R2 through a variable tap TR. If found desirable, the cathode 1 may also be coupled to ground through a variable condenser C4 which may have a value of about 20 mfd. to 50 mfd. maximum capacity. The screen grid 3 is connected to a source of positive potential 8 through a resistor R3. The screen grid 3 is also by-passed to ground for alternating currents through condenser C5.

The two anodes 4 and 5 of the tube V1 are connected in push-pull relation to opposite ends of a tunable tank circuit which includes condensers C1, C2 and C3 and inductances L1 and L2. The side band output circuit OC is coupled symmetrically by an inductance coil L3 to the tank circuit inductance coils L1, L2. The condensers C2, C3 (which connect together coils L1 and L2) are of low impedance for passing the side band frequencies but are of high impedance for blocking the signal frequencies from source A, which signal frequencies may be in the audio frequency range.

The center element of the tuning condenser C1 is grounded and the center connection of condensers C2 and C3 is grounded through a resistor R4 which has a small value of resistance but is of sufficiently large value to prevent split tuning of the tank circuit. The inner ends of the tank coil inductances L1, L2 are also connected in push-pull relation to the opposite ends of the secondary winding S of the modulation transformer T. The mid-point tap of the secondary winding S of transformer T is connected to the positive terminal of potential source 8. The primary winding P of the modulation transformer is connected to a signal input source A, which source A may be the amplified output of a voice frequency pick-up microphone.

The fundamental operation of Fig. 1 may be explained as follows: In Fig. 1 the cathode, control grid, and screen grid of tube V1, together with crystal X, resistors R1, R2, and condensers C5, C4, constitute a crystal controlled oscillator circuit. In other words, it is the carrier frequency oscillator generating high or radio frequency oscillations. The oscillator is of the grounded anode type; the screen grid 3 in this case acting as an anode which is grounded for radio frequencies by condenser C5. The addition of a condenser C4 facilitates and improves the generation of oscillations under crystal control. This part of the circuit (the crystal controlled oscillator) has been described in my Patent No. 2,298,437, and therefore it is sufficient to say that carrier frequency oscillations are generated in this part of the circuit.

The output circuit C1, C2, C3, L1, L2 is electronically coupled to the crystal controlled generator, since the anodes 4, 5 are electronically coupled to the screen grid 3. The two anodes 4, 5 which are connected in push-pull relation to the output tank circuit C1, C2, C3, L1, L2, are electronically coupled to the carrier generator electrodes. This part of the circuit is of the balanced type so that as long as everything is symmetrical, no carrier oscillations will reach the output terminals through coil L3.

In other words, both anodes are excited in like phase by equal carrier potentials which are bucked out or cancelled by the balanced tank circuit connection and arrangement. This holds true also when various differential modulating potentials are applied—as long as they are balanced and undistorted; that is, as long as the differential potential change of the two anodes is symmetrical with respect to ground potential. Since the carrier oscillations cannot be transmitted, there is left only the upper and lower side band of frequencies and the original signal frequencies. In this invention the tank circuit C1, L1, L2 is tunable by means of tuning condenser C1. It is usually desirable to tune the tank circuit to one side of the carrier generated, that is, for one of the side frequencies or one of the side bands. Thus the output circuit connected to the anodes 4 and 5 may be adjusted to pass either the lower or the upper side frequency bands into secondary L3, as pointed out in my Patent 1,876,107.

It is usually found desirable to tune the tank circuit for the upper side band frequencies, unless it is desired to invert the signal by transmitting the lower side band. It may be seen, therefore, that this circuit performs an essential part in a single side band transmitter. This is because the carrier frequency is balanced out, one side band is rejected by tuning, and the signal frequency is usually too low to pass through the high frequency circuits. Consequently, only a single side band of frequencies can pass through or be transmitted over the output conductors OC.

It may be noted that the center points of the tank circuit are connected to or are by-passed to ground with condensers. This is an aid in balancing the tank circuit since small strays are ineffective in causing unbalance. These ground paths also provide a means to conduct to ground the rejected frequencies. It may also be noted in this circuit that the differential anode potentials are applied at the center ends of the tank coils. These are generated in the signal source A and transmitted through the secondary of modulation transformer T.

The screen grid of tube V1 is supplied with positive direct current potential through resistor R3. This makes the direct current screen voltage slightly lower than the direct current voltage of the anodes, which permits the necessary amount of current flow to the anodes. As pointed out before, it is important to have the tank circuit well balanced and also to have the output circuit symmetrically coupled to each half of the tank circuit in order to balance out the carrier energy in the output circuit.

Figure 2:
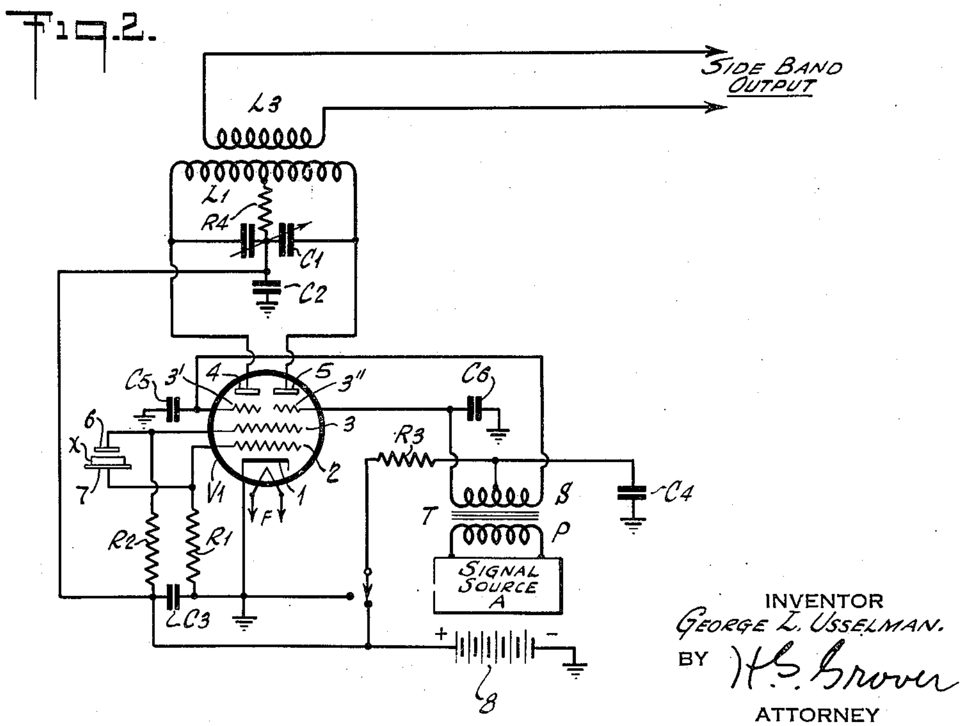
Fig. 2 is a circuit diagram modification of my invention which employs a tube having a cathode, a control grid, a screen grid, two suppressor grids and two anodes.

The circuit arrangement shown in Fig. 2 is a second embodiment of this invention. In this circuit, the tube V1 is shown as having cathode 1, control grid 2, screen grid 3, two suppressor grids 3′ and 3″ and two anodes 4 and 5. If desired, a double pentode tube can be used, in which case each pair of cathodes, control grids and screen grids would be connected together and operated in parallel. Cathode 1 of tube V1 is directly grounded. The control grid 2 is connected to one electrode 7 of a crystal X and also to ground through resistor R1. The screen grid 3 is connected to the other electrode 6 of crystal X and it is also connected to a source of positive potential 8 through a resistor R2.

The lower end of the resistor R2 is by-passed to ground through a condenser C3. The two suppressor grids 3′ and 3″ are connected in push-pull relation to the opposite ends of the secondary winding S of the modulation transformer T. By-pass condensers C5 and C6 are connected one to each of the third grids 3′ and 3″ and ground. The center point of the secondary winding S is by-passed to ground by a condenser C4 and it is also connected to the source of positive potential 8 through resistor R3 and a switch, so that the center point may be connected, when desired, to ground instead of to the source of potential 8. The primary winding P of the modulation transformer T is connected to a signal source A.

The two anodes 4 and 5 of tube V1 are connected in push-pull relation to opposite ends of the tunable tank circuit which includes condenser C1 and inductance coil L1. The center element of the tuning condenser C1 is by-passed to ground through condenser C2. Also, the center point of the tank inductance L1 is connected to the center element of the condenser C1 by a resistor R4, the latter being of a low value but of sufficient resistance to prevent split tuning of the tank circuit. The center element of condenser C1 and the coil L1 through R4 are connected to the source of positive potential 8. The side band output circuit is symmetrically coupled by inductance coil L3 to the tank coil L1.

The circuit of Fig. 2 is somewhat different from Fig. 1 but the principle of operation is similar. The crystal oscillator in this case again uses the cathode, control grid, and screen grid of tube V1. However, the crystal in this case is connected between the control grid and the screen grid, and the circuit oscillates as a "Pierce" circuit.

In Fig. 2 the signal modulation is applied to the two suppressor grids in push-pull relation. This differentially modulates the two anodes and the anode circuit. The carrier frequency energy is balanced out in this circuit the same as in that of Fig. 1. In Fig. 2 it will also be noted that the positive potentials are applied to both the screen grids and the suppressor grids through resistors R2 and R3 so that the anode circuit will be supplied with the necessary amount of direct current for proper operation. Again, in this circuit it is also necessary to have a well balanced anode and coupling circuit to reduce the carrier energy to a minimum in the output. In one circuit set up for operation, the tank circuit C1 and L1 was tuned for the lower side band at one time; for the upper side band at another time. The crystal frequency was about 2100 kilocycles, while the upper signal frequency was 10 kilocycles. The strengths of the carrier and rejected side band were about 20 decibels below the tuned side band frequency.

Figure 3:
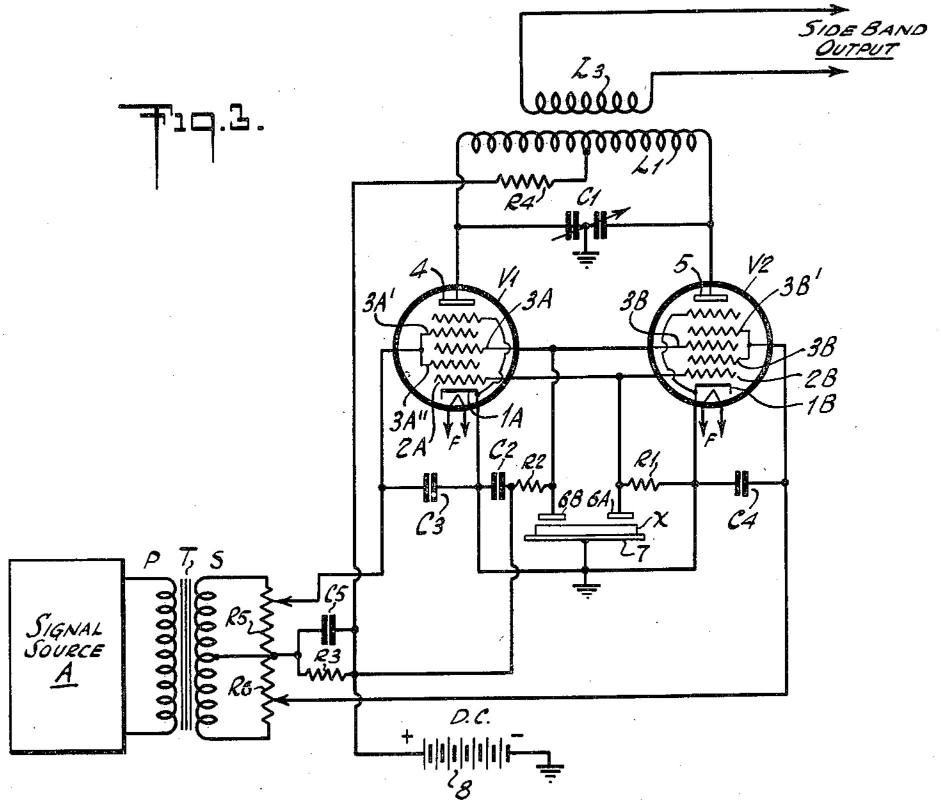
Fig. 3 is another modification of the circuit of this invention which employs two tubes of the pentagrid mixer amplifier type.

Fig. 3 is another embodiment of the circuit of this invention, which shows the use of two tubes V1 and V2, which are similar to the 6L7 type. The control grids 2A and 2B of these tubes are connected in parallel and both are connected to one of the smaller crystal electrodes 6A of the crystal X. The grids 2A and 2B are also connected to ground through a resistor R1. The cathodes 1A and 1B of both tubes are connected to ground. The third or center grids 3A and 3B are connected in parallel to the other small crystal electrode 6B. These third grids are also connected to a source of positive potential 8 through a resistor R2, the lower end of which is by-passed to ground by a condenser C2. The large crystal electrode 7 is connected directly to ground.

The second and fourth grids (of each tube V1 and V2) 3A', 3A'' and 3B', 3B'' are connected together and also connected as shown in push-pull relation to the opposite ends of the secondary winding S of the modulation transformer T through the corresponding potentiometers R5 and R6. These latter grids are also by-passed to ground through condensers C3 and C4. These condensers are of low impedance value for the carrier frequency but are of very high impedance value for the signal frequencies. The mid-point of the modulation transformer secondary is connected to the source of positive potential 8 through a resistor R3, the latter being by-passed by condenser C5. The primary winding P of transformer T is connected to a signal source A. It will be noted that each half of the secondary winding is shunted by the potentiometers R5 and R6.

The anodes 4 and 5 of tubes V1 and V2 are connected in push-pull relation to the opposite ends of a tunable tank circuit including condenser C1 and inductance coil L1. The center element of the tank tuning condenser C1 is grounded. The center point of the tank inductance coil L1 is connected to the source of positive potential 8 through a resistor R4. It is to be noted that the source of positive potential 8 is by-passed to ground for radio frequencies in this circuit arrangement by the condenser C2. The side band output circuit is symmetrically coupled to the tank coil inductance L1 by coupling coil L3.

The circuit of Fig. 3 shows the use of two pentagrid tubes in this invention. The crystal oscillator is again of the Pierce type but the crystal, as may be noted, is of the three electrode type. The control grids and the third grids form the grid and anode tube elements of the oscillator. These grids of tubes V1 and V2 are connected as shown in parallel. The shield grids (grids two and four) of each tube are modulated in push-pull relation from the modulation transformer. This differentially modulates the currents and voltages in the anode tank circuit. The oscillator grids and the modulated grids of tubes V1 and V2 are supplied with positive potential through resistors so that the anodes will receive the proper amount of direct current. Taps on potentiometers R5 and R6 on the modulation transformer T may be adjusted in such manner as to obtain a better balance of the anode circuit and thus aid in balancing out the carrier energy in the side band output circuit. The functions of the other parts of this circuit are similar to those of Fig. 1. It might be noted that by-pass condensers C3 and C4 of Fig. 3 are of low impedance for the carrier frequency but are of quite high impedance for the signal frequencies. The resistor R4 in all cases is used to couple the center of the tank coil to ground without causing split tuning; i. e., without virtually converting the tank circuit into two separate tuned circuits which might tune to slightly different frequencies.

Figure 4:
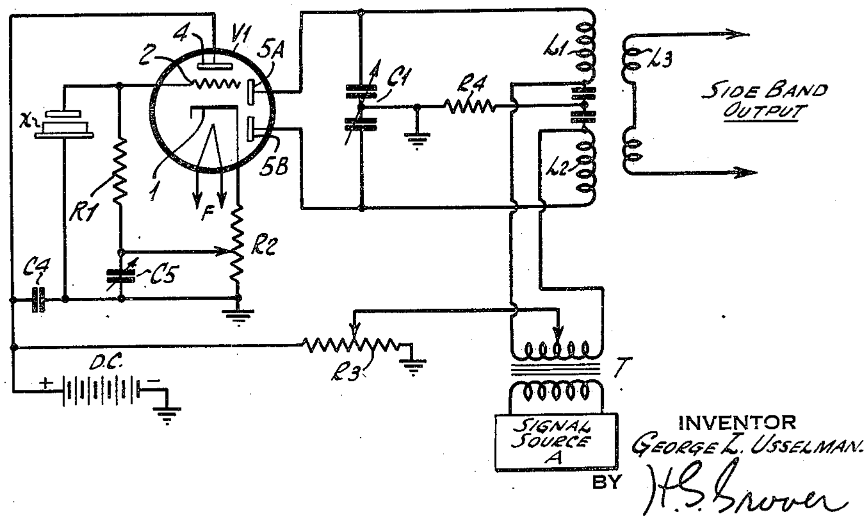
Fig. 4 is a circuit diagram modification of my invention which employs a duplex diode triode type of tube.

Referring now to the modification shown in Fig. 4 (which uses a duplex diode triode tube V1 similar to the 6R7 or 6T7), the cathode 1, control grid 2 and anode 4 together with resistors R1 and R2 and the crystal X constitute the carrier oscillator, which is of the grounded anode type similar to that shown in Fig. 1. Anode 4 is grounded for high frequency currents by the action of by-pass condenser C4. The tube V1 has two rectifier anodes 5A and 5B for operation with the same cathode. These two rectifier anodes are connected to opposite ends of the push-pull tank circuit which includes condenser C1 and inductances L1 and L2. The circuit of Fig. 4 also includes a small 50 mmf. variable condenser C5 which is connected between the lower end of grid resistor R1 and ground. This facilitates the generation of carrier oscillations. The output circuit is likewise symmetrically coupled by inductance coil L3 to the inductance coils L1 and L2. The direct current modulating means are similar to those shown in Fig. 1.

The proper operation of Fig. 4 as a carrier suppression side fraquency generator requires that each one of the rectifier anodes or diodes 5A and 5B have equal electron coupling to the cathode. In other words, their rectifying characteristics should be similar. When the circuit of Fig. 4 is operating, the cathode of tube V1 has impresser on it the crystal frequency carrier oscillating potentials besides the direct current bias potential caused by the flow of direct current in the cathode resistance R2. This carrier potential is impressed equally in like phase on the two rectifier anodes 5A and 5B through electron coupling to the cathode 1. Signal oscillating potentials are impressed in push-pull relation on the rectifier anodes from the signal source A through transformer T and the push-pull tank circuit, as shown. The carrier oscillations are balanced out or cancelled in the tank circuit. One side frequency is attenuated or rejected and the other side frequency is accepted and accentuated by the tank circuit tuning. The signal frequencies will not pass through the coupling circuits so that the output coupling coil L3 has in it only the energy of one side band.

Other types of circuits can be used also with this type of tube, for example the crystal oscillator part of the circuit may be constructed to operate by the Pierce mode of oscillation, etc. Again, in Fig. 4 an inductive impedance may be connected between the cathode and ground, to be in series with or to replace part or all of resistor R2.

The resistor R2 is made in the form of a potentiometer so that the regeneration may be set at any desirable amount for the crystal oscillator.

The resistor R3 is made adjustable so that too much bias will not be imposed on tube V1 by using too much rectifier current through resistor R2. Resistor R3 permits some degree of adjustment and it also permits adjustment of the rectifier current to obtain the maximum amount of undistorted side band output.

In one circuit set up for operation, the tank circuit C1, L1 and L2 was tuned for the lower side band and for the upper side band frequencies at different times. The crystal frequency was about 2000 kilocycles and the signal about 15 kilocycles.

When the signal source A of this invention is used for voice frequencies, suitable filters should be used in the output circuits to insure proper transfer of only the side frequencies desired.

Figure 5:
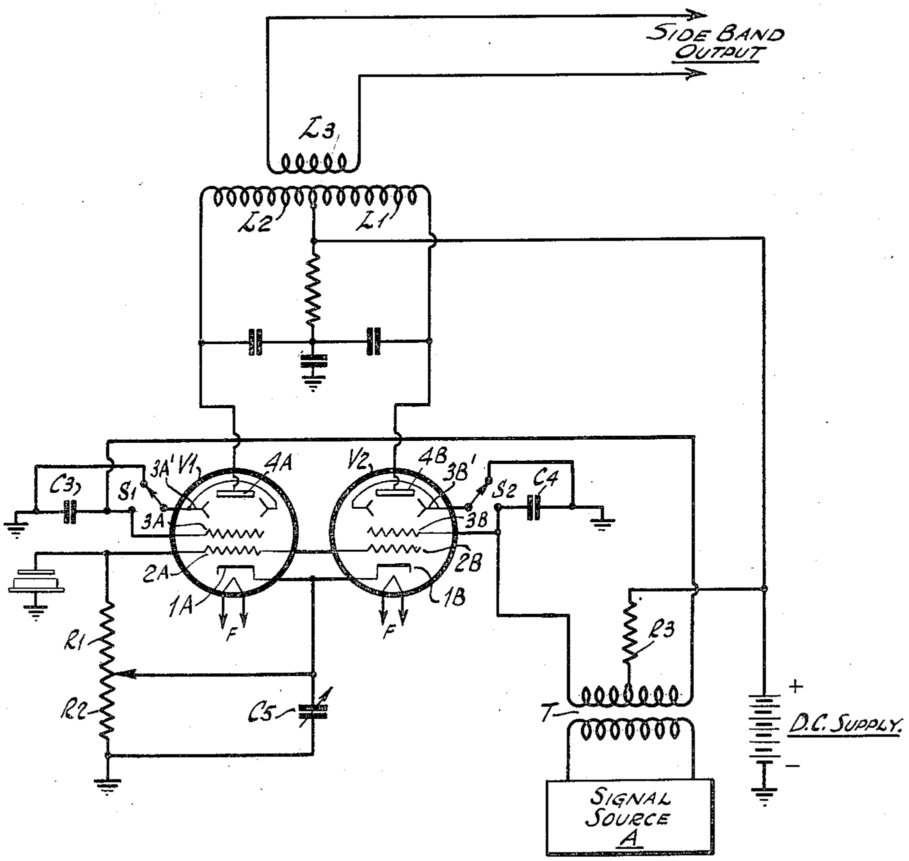
Fig. 5 is a circuit diagram of a still further modification of my invention which employs two tubes of the power amplifier type.

The modification shown in Fig. 5 is another version of this invention. The oscillator is similar to that shown in Fig. 1 but the modulation frequency is applied in a manner similar to that shown in Figs. 2 and 3. The circuit of Fig. 5 includes two tubes (V1 and V2) of the power amplifier type which includes cathodes 1A and 1B, and control grids 2A and 2B, each connected to operate in parallel, as shown. The power amplifier tubes V1 and V2 may be of the 6AG7 type. The switches S1, S2 are operated in both positions; that is, with the third grids (3A′ and 3B′) grounded and also with the third and second grids (3A and 3B) connected in parallel. It would be preferable to operate with grids 3A′ and 3B′ (that is, the shields) permanently grounded and omit switches S1 and S2 when 6AG7 tubes are being used.

The tank circuit (including a condenser in parallel with inductance coil L1, L2) is connected to anodes 4A and 4B; the circuit is tuned to the lower side band at one time and to the upper side band at another time. The crystal frequency in this modification was about 2,000 kilocycles and the highest frequency of the modulation potentials from source A was about 10 kilocycles. It should be understood that proper voltages would have to be applied to the screen grids and anodes for optimum results.

Throughout this specification I mention the desirability of balance and linearity in these circuits. The statements in regard to linearity may be misunderstood, therefore the following explanation is given. It is customary in some balanced modulator circuits for the modulator impedances (tubes in this case) to be non-linear. In the circuits of this application the two tubes or two halves of a tube could be operated on the lower bend of the tube characteristic curve. The output of the usual balanced modulator would contain: (*a*) The frequencies identical with the components of the signal potential in the input. (*d*) The carrier frequency would be balanced out. (*c*) Frequencies equal to the sum of the carrier frequency and each component in the signal. (*d*) Frequencies equal to the difference between the carrier frequency and each component in the signal. However, as pointed out in this application, besides balancing out the carrier frequency, the output circuits of this invention are tuned to accept one of the side frequencies, which then automatically rejects all other frequencies. Also, the signal frequencies (usually low in the spectrum) will not pass through the output coupling circuits.

These balanced modulators (and side band generators) may also be operated on the straighter portions of the tube characteristic curve. However, if the signal is so strong that it drives the modulator tubes beyond either the knee or past the cut off point, or both, on the tube characteristic, then distortion will result. This is the distortion of the signal referred to in this application. Also, it should be noted that operating the balanced modulator tubes too near either end of the tube characteristic may allow more of the carrier frequency energy to pass through the circuits during modulation.

The output circuits are preferably designed to have substantially flat frequency amplitude characteristics over the desired pass band.

Also, if desired, the output circuits may be tuned to mid or carrier frequency and pass both side bands without the carrier which will be absent because of the balanced action of the modulation circuits. In this case, suitable filters may be used to pass only the desired side band.

What is claimed is:

1. A carrier frequency oscillation generator and a carrier suppression balanced modulator comprising a single electron discharge device having two anodes, a screen grid, a control grid, and a cathode, the cathode, control and screen grids functioning as the carrier frequency oscillation generator, and two anodes electronically coupled thereto functioning as part of a carrier suppression balanced modulator.

2. In a signaling system, a single electron discharge device having two anodes, a screen grid, a control grid, and a cathode, said cathode, screen grid and control grid being connected to generate high frequency carrier oscillations, a tuned high frequency circuit connected to and between said anodes, a source of signal voltages, and means for oppositely applying said voltages to said anodes.

3. In a signaling, wave generating, and frequency modulation system, a piezo-electric frequency control crystal, a single electron discharge device having two anodes, a screen grid, a control grid and a cathode, said cathode, screen grid and control grid being connected to said piezo-electric crystal to generate high frequency carrier oscillations, a tuned high frequency circuit connected to and between said anodes, a source of signal voltages, and means for oppositely applying said voltages to said anodes.

4. In a signaling, wave generating, and frequency modulation system, a piezo-electric frequency control crystal, a single electron discharge device having two anodes, a screen grid, control grid and cathode, said cathode, screen grid and control grid being connected to said crystal to generate high frequency carrier oscillations, an off-tuned high frequency circuit connected to and betwen said anodes, a source of signal voltages, and means for applying said voltages to said anodes.

5. In a signaling, wave generating, and frequency modulation system, a piezo-electric crystal controlled single side band generator, a single electron discharge device having two anodes, a screen grid, a control grid, and a cathode, said device having its elements connected so as to combine the functions of a carrier suppressor and a single side band generator into one circuit.

6. In a signaling system, in combination, a carrier frequency oscillation generator and a carrier suppression balanced modualtor having a tuned output circuit including a single electron discharge device having two anodes, a screen grid, a control grid, and a cathode, said device having its anodes, grids and cathode connected so as to combine the functions of the carrier frequency oscillation generator and the carrier suppression balanced modulator into one circuit.

7. In a signaling system, in combination, a carrier frequency oscillation generator and a carrier suppression balanced modulator constituting a single side band generator, said single side band generator including a tuned high frequency output circuit, a piezo-electric crystal radio frequency oscillator, a single electron discharge device having two anodes, a screen grid, a control grid, and a cathode, the anodes of said device being connected to said tuned output circuit, the cathode, screen grid and control grid being connected to said radio frequency oscillator to combine the functions of the carrier frequency oscillation generator and the carrier suppression balanced modulator into one circuit.

8. In a signaling system, in combination, a carrier frequency oscillation generator and a carrier suppression balanced modulator including a single electron discharge device having two anodes, a screen grid, a control grid, and a cathode, an output circuit including an inductance having its outer ends connected to the anodes of said device in push-pull relation to form a carrier suppression balanced modulator, the cathode, screen grid and control grid being connected to function as a carrier frequency oscillation generator.

9. In a signaling system, in combination, a carrier frequency oscillation generator and a carrier suppression balanced modulator including a single electron discharge device having two anodes, two suppressor grids, a screen grid, a control grid, and a cathode, the anodes of said device being connected in a tuned tank circuit to form a carrier suppression balanced modulator, the cathode, control grid and screen grid of said device being connected to function as a carrier frequency oscillator which is combined with said tank circuit by said device.

10. In a signaling system, in combination, a carrier frequency oscillation generator and a carrier suppression balanced modulator including a pair of electron discharge devices, each having an anode, a screen grid, a suppressor grid, two separate control grids shielded from each other, and a cathode, said devices combining the functions of the carrier frequency oscillation generator and the carrier suppression balanced modulator into one circuit.

11. In a signaling system, in combination, a carrier frequency oscillation generator and a carrier suppression balanced modulator including a pair of electron discharge devices each having an anode, a beam forming element, a screen grid, a control grid, and a cathode, each device combining the functions of the carrier frequency oscillation generator and the carrier supression balanced modulator into one circuit.

12. In a signaling system, a single electron discharge device having two anodes, a screen grid, a control grid, and a cathode, said cathode, screen grid and control grid being connected to generate high frequency carrier oscillations, a tuned high frequency circuit connected to and between said anodes, a source of signal voltages, and means for differentially modulating said anodes by said source.

13. In a signaling, wave generating, and frequency modulation system, a piezo-electric frequency control crystal, a single electron discharge device having two anodes, a screen grid a control grid and a cathode, connections between said piezo-electric crystal and said control grid and cathode, a resistance in shunt with said crystal, a connection from said cathode to a point intermediate the ends of said resistor, a parallel tuned high frequency circuit connected to and between said anodes, a source of signal voltages, and means for applying said signal voltages in opposing phase relation to said anodes.

14. In a signaling, wave generating, and frequency modulation system, a piezo-electric frequency control crystal, a single electron discharge device having two symmetrically arranged anodes, a screen grid, a control grid and a cathode, connections between said piezo-electric crystal and said control grid and cathode, a balanced parallel tuned modulator circuit coupled to said anodes, a source of signal voltages, and means for applying voltages in opposing phase relation to said anodes.

15. In a signaling, wave generating, and frequency modulation system, a piezo-electric crystal controlled single side band generator including a single electron discharge device having a screen grid, a control grid, a cathode and two anodes arranged symmetrically relative to said cathode, and a crystal coupled between said cathode and said control grid, said device having its elements connected so as to combine the functions of a carrier suppressor and a generator into one circuit.

16. In a signaling system, in combination, a carrier frequency oscillation generator and a carrier suppression balanced modulator constituting a single side band generator, said single side band generator including a tuned high frequency output circuit, a piezo-electric crystal, a single electron discharge device having two anodes, a screen grid, a control grid, and a cathode, means connecting the anodes of said device to said tuned output circuit, the cathode, screen grid, control grid and crystal being so connected as to produce oscillations, said tuned circuit being tuned to one side of the operating frequency of said crystal.

17. The method of combining the functions of a carrier suppression side band generator in one circuit, including the steps of generating a radio carrier, superimposing lower signal frequencies upon said radio carrier, balancing out the carrier, and suppressing certain of said lower signal frequencies, appearing on one side of said carrier frequency, and passing out the unsuppressed frequencies on the other side of said carrier frequency.

18. In a signaling, wave generating, and frequency modulation system, comprising a crystal controlled oscillation circuit, a balanced modulator tuned circuit electronically coupled to said crystal controlled oscillation circuit and having its electrical center coupled to ground, a signal source of voltage differentially coupled to said balanced tuned modulator circuit, and a side band output circuit coupled to said balanced tuned circuit.

19. A carrier frequency oscillation generator and a carrier suppression modulator comprising electronic apparatus having a pair of anodes, each anode having associated therewith a screen grid, a control grid, and a cathode for producing electrons, the cathode, control grid, and screen grid functioning as the carrier frequency oscillation generator, and the two anodes electronically coupled thereto functioning as part of a carrier suppression balanced modulator.

GEORGE L. USSELMAN.

REFERENCES CITED

The following references are of record in the file of this patent:

UNITED STATES PATENTS

| Number | Name | Date |
|---|---|---|
| 1,597,398 | Wilson | Aug. 24, 1926 |
| 1,896,268 | Willoughby | Feb. 7, 1933 |
| 2,156,088 | Heising | Apr. 25, 1939 |
| 2,161,406 | Charrier | June 6, 1939 |
| 2,210,015 | Usselman | Aug. 6, 1940 |
| 2,409,457 | Usselman | Oct. 15, 1946 |